(12) United States Patent
Ramfjord

(10) Patent No.: US 10,046,405 B2
(45) Date of Patent: Aug. 14, 2018

(54) SALVAGE SAWING SYSTEM AND METHOD

(71) Applicant: 1Diamond AS, Gjovik (NO)

(72) Inventor: Harald Ramfjord, Gjovik (NO)

(73) Assignee: Quanta Associates, L.P., Houston, TX (US)

(*) Notice: Subject to any disclaimer, the term of this patent is extended or adjusted under 35 U.S.C. 154(b) by 0 days.

(21) Appl. No.: 15/527,629

(22) PCT Filed: Nov. 26, 2015

(86) PCT No.: PCT/NO2015/050225
§ 371 (c)(1),
(2) Date: May 17, 2017

(87) PCT Pub. No.: WO2016/085350
PCT Pub. Date: Jun. 2, 2016

(65) Prior Publication Data
US 2017/0320150 A1 Nov. 9, 2017

(30) Foreign Application Priority Data
Nov. 26, 2014 (NO) .................................. 20141423

(51) Int. Cl.
*B23D 57/00* (2006.01)
*B26D 1/547* (2006.01)
*B63C 11/52* (2006.01)

(52) U.S. Cl.
CPC ..... *B23D 57/0007* (2013.01); *B23D 57/0084* (2013.01); *B26D 1/547* (2013.01); *B63C 11/52* (2013.01)

(58) Field of Classification Search
CPC ............ B23D 57/0007; B23D 57/0084; B23D 57/0038; B23D 57/0053; B23D 57/0061; B26D 1/547
(Continued)

(56) References Cited

U.S. PATENT DOCUMENTS 3,463,271 A 8/1969 St Louis
3,635,207 A * 1/1972 Grage ..................... B28D 1/08
125/21
(Continued)

FOREIGN PATENT DOCUMENTS

CN 201128080 Y 10/2008
CN 101612683 A 12/2009
(Continued)

OTHER PUBLICATIONS

Christensen, Eirik, International Search Report for PCT/NO2015/050225, dated Mar. 4, 2016, 3 pages, Nordic Patent Institute, Denmark.
(Continued)

*Primary Examiner* — Frederick L Lagman
(74) *Attorney, Agent, or Firm* — Oathout Law Firm; Mark A. Oathout

(57) ABSTRACT

The present invention relates to a wire cutting system and method for subsea cutting of large structures (6). The system includes two feeding towers (2) with feeding tower first ends secured into a seabed floor. A crossbeam (1) is located between the two feeding towers (2). Wire feeding trolleys (8) are connected to the feeding towers (2), whereby the wire feeding trolleys (8) are allowed to move a cutting distance along the feeding towers. A cutting wire (4) traverses between the wire feeding trolleys.

14 Claims, 9 Drawing Sheets

(58) Field of Classification Search
USPC .......................................... 405/156; 83/651.1
See application file for complete search history.

(56) References Cited

U.S. PATENT DOCUMENTS

| | | | |
|---|---|---|---|
| H45 H | 4/1986 | Gilmore | |
| 4,678,372 A | 7/1987 | Cousty | |
| 5,718,216 A | 2/1998 | Plattner | |
| 6,267,037 B1 | 7/2001 | McCoy, Jr. | |
| 6,273,645 B1* | 8/2001 | Hamre | B63B 21/26 114/265 |
| 6,371,696 B1 | 4/2002 | Eathorne | |
| 7,036,599 B2* | 5/2006 | Matteucci | B23D 57/0038 166/361 |
| 7,770,575 B2* | 8/2010 | Brocco | B23D 57/0023 125/21 |
| 7,922,424 B2* | 4/2011 | Clark, II | B23D 57/0007 405/156 |
| 8,833,219 B2* | 9/2014 | Pierce | B23D 57/0007 30/102 |
| 8,833,358 B1 | 9/2014 | Robinson, III | |
| 2001/0017072 A1* | 8/2001 | Poetzsch | B26D 3/006 83/174 |
| 2004/0069103 A1 | 4/2004 | Matteucci | |
| 2006/0115331 A1 | 6/2006 | Matteucci | |
| 2008/0304915 A1* | 12/2008 | Bang | B23D 57/0084 405/224.1 |
| 2009/0266552 A1 | 10/2009 | Barra et al. | |
| 2009/0314149 A1 | 12/2009 | Clark, II | |
| 2010/0186564 A1 | 7/2010 | Pierce | |
| 2011/0150623 A1 | 6/2011 | Thomas et al. | |
| 2011/0208358 A1 | 8/2011 | Gjelsten | |
| 2011/0214543 A1 | 9/2011 | Shae et al. | |
| 2011/0290501 A1 | 12/2011 | Duncan et al. | |
| 2012/0117959 A1 | 5/2012 | Lewkoski | |
| 2012/0174723 A1 | 7/2012 | Matteucci | |
| 2012/0189390 A1 | 7/2012 | Belinsky et al. | |
| 2015/0290727 A1* | 10/2015 | Matteucci | B23D 57/0084 83/13 |
| 2015/0367430 A1 | 12/2015 | Ramfjord | |

FOREIGN PATENT DOCUMENTS

| | | | |
|---|---|---|---|
| CN | 102229009 A | 11/2011 | |
| EP | 1055498 | 11/2000 | |
| EP | 0540834 B2 | 5/2004 | |
| JP | H10258423 A | 9/1998 | |
| JP | 2001162617 A | 6/2001 | |
| NO | 20070788 | 7/2008 | |
| WO | 86/06121 A1 | 10/1986 | |
| WO | 88/02718 A1 | 4/1988 | |
| WO | 99/10232 A1 | 3/1999 | |
| WO | 99/43921 A1 | 9/1999 | |
| WO | 00/78491 A1 | 12/2000 | |
| WO | 2009084953 | 7/2009 | |
| WO | WO-2009107153 A1 * | 9/2009 | ......... B23D 57/0023 |
| WO | 2011062504 | 5/2011 | |
| WO | WO-2013080228 A1 * | 6/2013 | ......... B23D 57/0084 |
| WO | 2014092568 | 6/2014 | |
| WO | WO-2014106081 A1 * | 7/2014 | ......... E02B 17/0034 |

OTHER PUBLICATIONS

Christensen, Eirik, Written Opinion of the International Searching Authority for PCT/NO2015/050225, dated Mar. 4, 2016, 4 pages, Nordic Patent Institute, Denmark.
Rode, Henrik M., Norwegian Search Report for Patent Application No. 20141423, dated Apr. 21, 2015, 2 pages, Norwegian Industrial Property Office, Norway.
O'Connell, Wayne, Examination Report No. 1 for standard patent application No. 2013370266, dated Mar. 27, 2017, 4 pages, IP Australia, Australia.
MacFarlane, Evan H, Office Action for U.S. Appl. No. 14/655,848, dated Jun. 26, 2017, 20 pages, United States Patent and Trademark Office, Alexandria, VA, United States.
MacFarlane, Evan H, Office Action for U.S. Appl. No. 14/655,848, dated Nov. 17, 2017, 28 pages, United States Patent and Trademark Office, Alexandria, VA, United States.
EPO, Rijks, Mark, Written Opinion of the International Searching Authority, pp. 1-5, dated Jun. 30, 2015, The Hague, Netherlands.
UK IPO, Parker, Megan, Examination Report under Section 18(3), pp. 1-3, dated Oct. 3, 2016, Newport, South Wales.

* cited by examiner

SALVAGE SAWING SYSTEM AND METHOD

The present invention relates to a wire cutting system for subsea cutting of large structures. Specifically, the system is intended for subsea cutting of shipwrecks for easy removal, while simplifying later decommissioning.

It is considered a great advantage to cut such structures subsea as moving such structures in one part necessitates very large and expensive crane ships. Breaking such ships is also problematic, and smaller structures are considerable easier to handle when the parts are to be brought on shore.

There are, according to known solutions for cutting and removing shipwrecks and other large structures from the seabed. Such solutions include the use of wire saws and chain cutting systems.

In chain cutting systems where a chain is pulled from above and that include jack-up installations, normally necessitates drilling to get the chain in position, as the chain cuts from below and upwards. The chain imposes forces on the structure, and thereby a risk of displacing cargo and structures.

It is a purpose with the present invention to provide a system that imposes low forces on the structure to be cut and thus reduced risk of displacing cargo and structures. Furthermore, it is a purposes of the invention to provide a safe and fully submerged system that results in a very low risk to personnel. The system will typically be fully electric with little or no risk of pollution from hydraulic fluids.

It is also a purpose with the present invention to provide a system that is safe to operate and that can be operated without diver intervention. The system is easy to adjust to provide a clean and predictable cut and low forces are transmitted to the wreck and cargo. The ease of installation and adjustments also facilitate setting the cutting lines to positions where the amount of material to be removed is minimized and the structures are easily removed. The ability to monitor and independently control all the sawing parameters also ensures an efficient sawing process and damage control in off-design situations. The wires are specialised to ensure that the operating parameters and performance is maintained.

Accordingly, the present invention relates to a seabed attachable subsea wire sawing system. The system includes a first feeding tower with a first feeding tower first end with a seabed attachment portion for attachment to a seabed floor and a second feeding tower with a second feeding tower first end with a seabed attachment portion for attachment to the seabed floor. A first wire feeding trolley is connected to, and linearly displaceable a cutting distance along the first feeding tower. A second wire feeding trolley is connected to, and linearly displaceable a cutting distance along the second feeding tower. At least two cutting wire pulleys are located on each wire feeding trolley whereof at least one cutting wire pulley on each wire feeding trolley is motorized. The cutting wire forms a loop and traverses between the two cutting wire pulleys on the first wire feeding trolley and on the second wire feeding trolley. An adjustable crossbeam is located between the first feeding tower and the second feeding tower above the first wire feeding trolley and the second wire feeding trolley. At least one crossbeam actuator assembly in connection with the adjustable crossbeam enables adjustment of a distance between the first feeding tower and the second feeding tower at the location of the crossbeam.

The crossbeam may be an adjustable length crossbeam and the least one crossbeam actuator assembly may be provided to adjust the length of the crossbeam.

The first feeding tower and the second feeding tower may be substantially parallel.

At least one buoyancy device may be located within or on the outside of the crossbeam.

A suction anchor may be connected to the seabed attachment portion of each feeding tower.

The crossbeam may be linearly displaceable along the first feeding tower and the second feeding tower in a direction substantially parallel to the feeding towers.

The system may further include a crossbeam height actuator at each side of the crossbeam provided to enable independent displacement of the crossbeam along the first feeding tower and the second feeding tower.

The cutting wire forms a cutting wire loop with an upper wire and a lower wire extending between the first wire feeding trolley and the second wire feeding trolley. A distance D is formed between the upper wire and the lower wire, and the cutting distance may be greater than the distance D between the upper wire and the lower wire, whereby both the upper wire and the lower wire are allowed to extend through an object to be cut.

The system may further include a wire tension control actuator arranged to adjust a distance between the at least two cutting wire pulleys or guide wheels of each wire feeding trolley for adjusting at least one of cutting wire tension, cutting wire angle, cutting wire pulley or guide wheel contact angle and cutting wire length.

A distance between the first feeding tower and the second feeding tower may be at least 50 m.

The length of the cutting wire may be at least 110 m.

The system may further include at least one wire cutter located on each wire feeding trolley.

Furthermore, the invention relates to a method for performing a substantially vertical cut in a large subsea structure with a seabed attachable subsea wire sawing system and wherein a cutting wire forms a cutting wire loop with an upper wire and a lower wire extending between a first wire feeding trolley and a second wire feeding trolley, the method including the following steps:

installing the system onto a seabed over a large subsea structure to be cut from an installation vessel;

lowering a first wire feeding trolley along a first feeding tower and then lowering a second wire feeding trolley along a second feeding tower until the lower cutting wire extend between the first feeding wire feeding trolley and the second wire feeding trolley reaches the large subsea structure to be cut, lowering a crossbeam to a location adjacent and above the wire feeding trolleys, driving the cutting wire loop between the first wire feeding trolley and the second wire feeding trolley, lowering the wire feeding trolleys while cutting the large subsea structure, continue lowering the crossbeam to a location adjacent and above the large subsea structure that is cut, continue lowering the wire feeding trolleys while cutting the large subsea structure and while monitoring cutting wire tension, wire speed, motor current and torque, feeding trolley position, wire direction, wire slip, feeding and angle of attack.

The method may further include feeding signals from the monitoring step to a control unit, and in the event of a signal indicating rapid cutting wire tension decrease, lock tension control actuators in position, stop the lowering of the wire feeding trolleys, reduce or stop wire speed, slowly increase wire tension and resume wire speed and feeding.

SHORT DESCRIPTION OF THE ENCLOSED DRAWINGS

Figure 1:
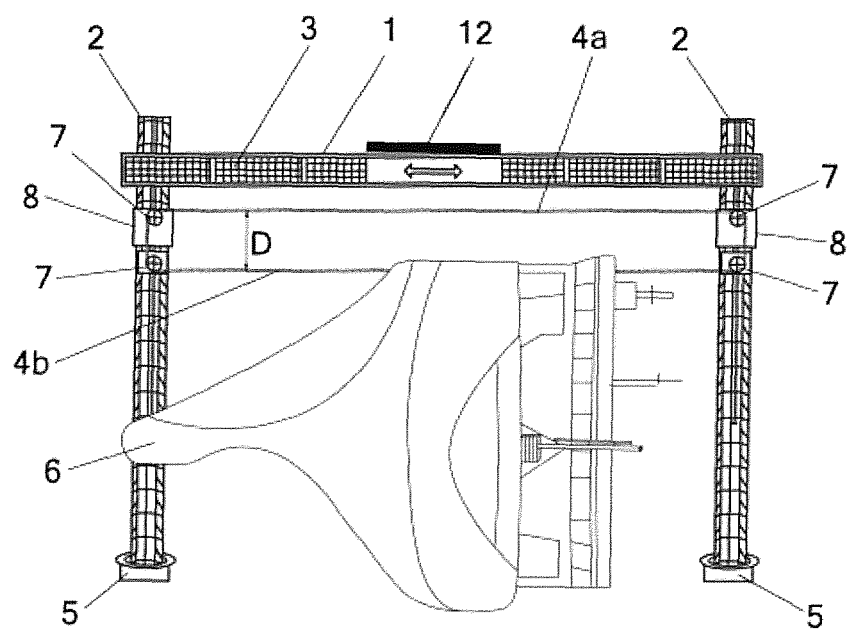
FIG. 1 is a front view of a sawing system according to the invention located over a ship on a seabed.
Figure 5:
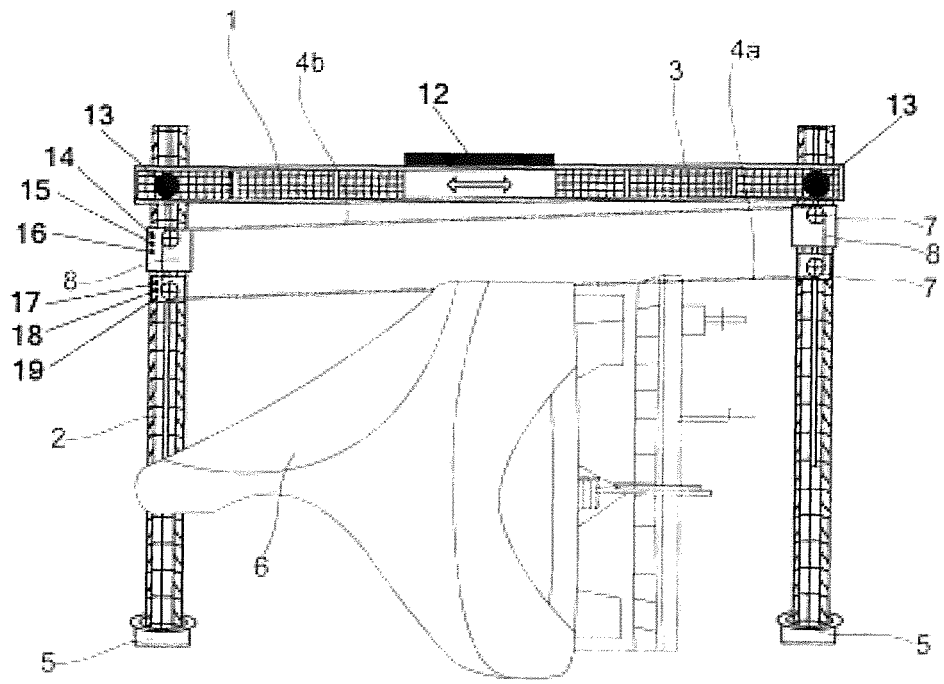
Figure 6:
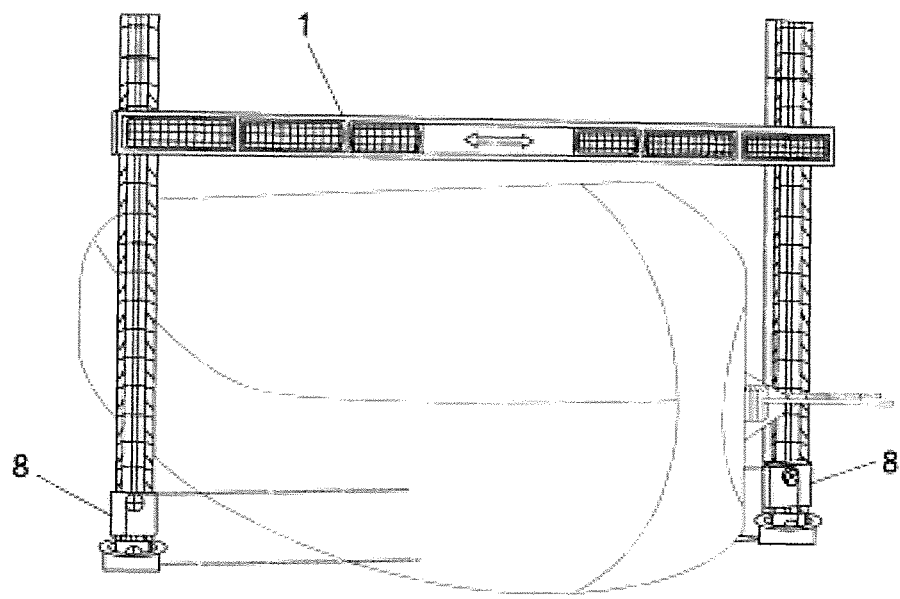
Figure 7:
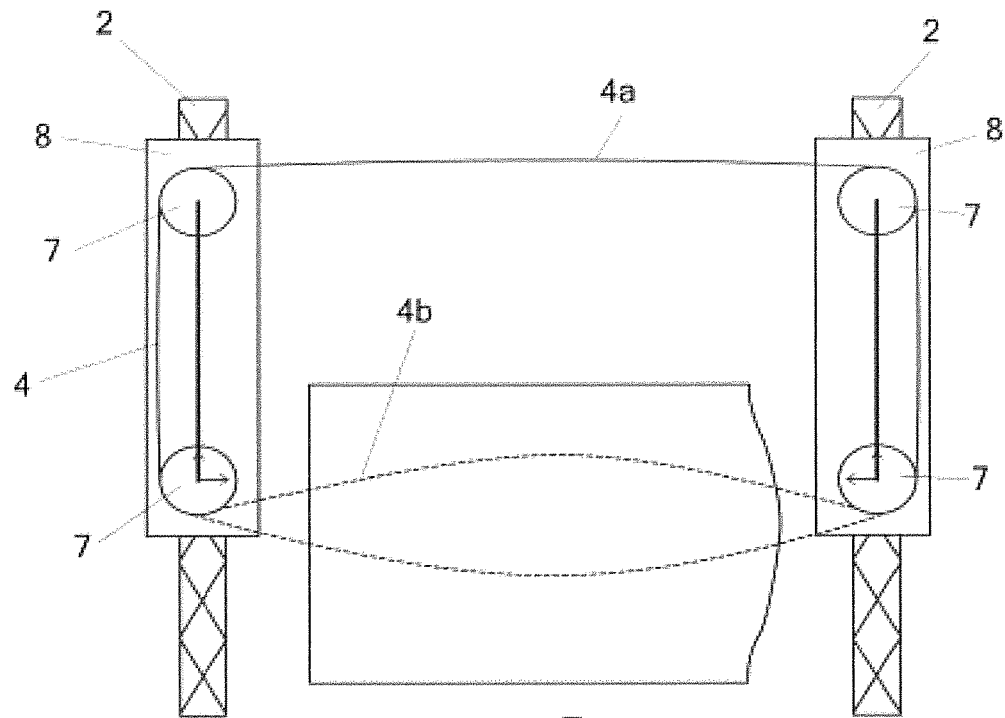
Figure 8:
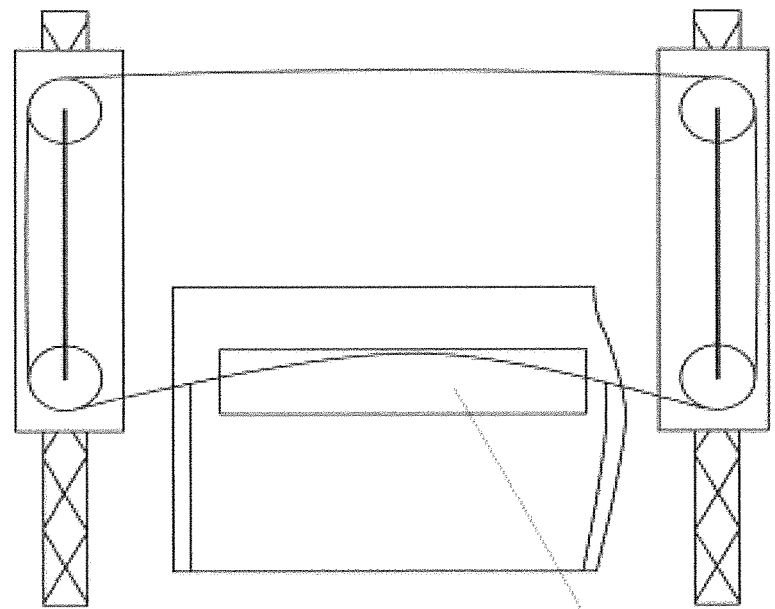
Figure 9:
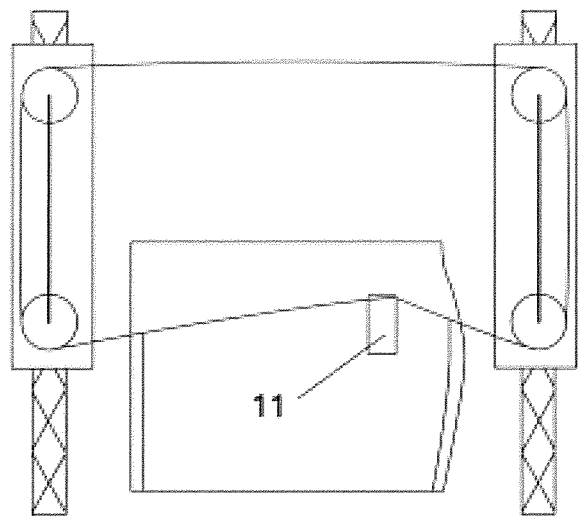
Figure 10:
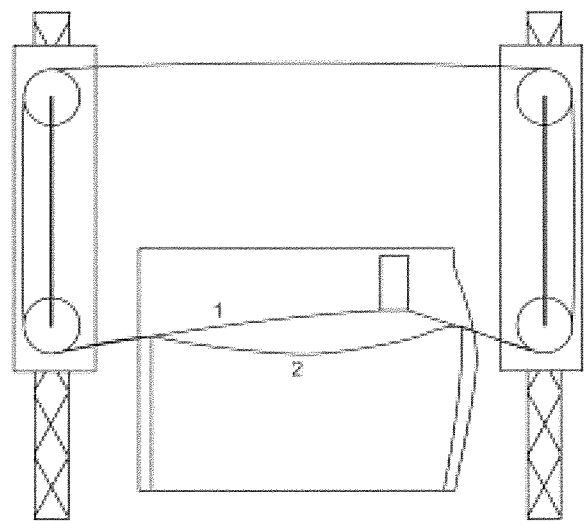
Figure 11:
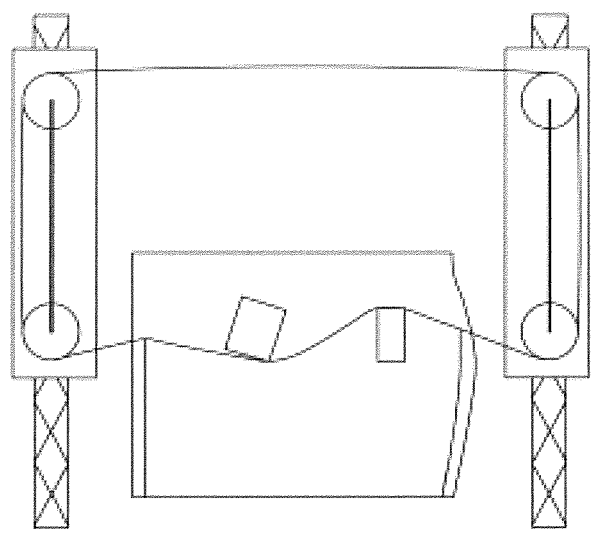
Figure 12:
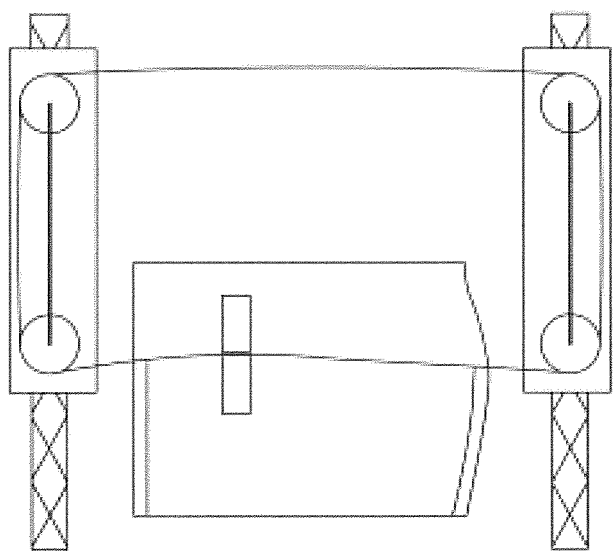
Figure 13:
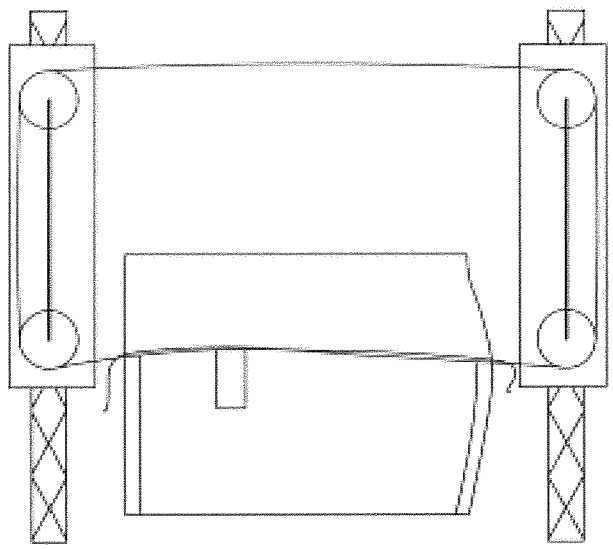

FIG. 5 corresponds to FIG. 1 and is a front view of a sawing system according to the invention, located over a ship on a seabed with feeding trollies and a sawing wire loop in an upper slanting position and a crossbeam in an upper position;

FIG. 6 corresponds to FIG. 5 and shows the feeding trollies and the sawing wire loop in a lower position and the crossbeam in an lowered position;

FIGS. 7-14 are schematic representations of the sawing system of the invention in different scenarios, where:

FIG. 7 shows a scenario where only one wire is located within the object and the feeding trolleys are fed at the same rate along the two feeding towers;

FIG. 8 shows a normal scenario where the sawing wire cuts into a piece of cargo or structure extending over a large portion inside the object to be cut;

FIG. 9 shows a scenario where the sawing wire cuts into a hard object;

FIG. 10 shows a scenario where the sawing wire undergoes a sudden drop in sawing wire tension;

FIG. 11 shows a scenario where the sawing system compensate for moving cargo;

FIG. 12 shows a scenario where the sawing system releases a stuck wire;

FIG. 13 shows a scenario where the sawing system removes a stuck and cut off wire after installation of a new wire.

Figure 14:
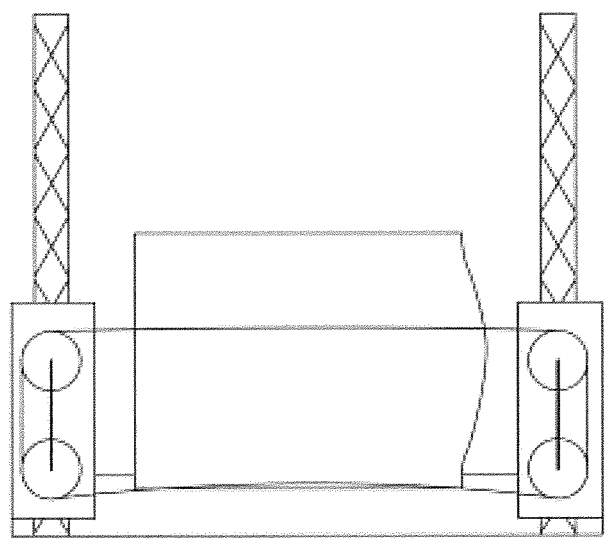

FIG. 14 shows a scenario where the sawing system finishes the cut; and

Figure 15:
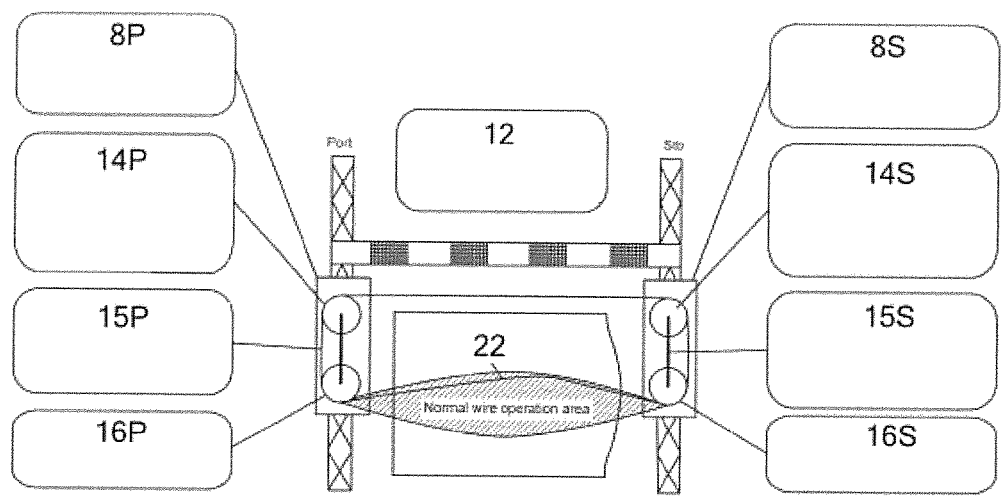

FIG. 15 is a schematic representation of the various functions and components of the system.

Below is a description of an embodiment of the invention described with reference to the accompanying drawings:

FIG. 1 shows a shipwreck 6, located on a sea bed. Two feeding trolleys 8 are each shown with two wheels or pulleys 7 for a wire loop with an upper wire portion 4a and a lower wire portion 4b. An electric motor is located in each trolley for driving at least one of the pulleys at each trolley 8. The wire speed and tension is controlled and the torque and speed of the electric motors is controlled based on the monitored parameters.

A distance D is formed between the upper wire portion 4a and the lower wire portion 4b. The distance D will depend on the distance between the pulleys 7 on each trolley 8. This distance is adjustable to enable adjustment of wire tension. Tension is monitored and adjusted during the cutting phase.

The two feeding trolleys 8 run along two feeding towers 2. Electrically driven actuators moves the two feeding trolleys 8 independently along the feeding towers 2 while monitoring and adjusting their position. The downward force is also monitored and controlled.

The two feeding towers 2 are formed as trusswork structures and are secured to the seabed 9 with two suction anchors 5. A crossbeam 1 include buoyant elements 3 for keeping the feeding towers 2 in an upright position. The buoyant elements 3 can be inflatable elements or liquid tanks that are filled with pressurized air as required. The amount of inflation can be varied to accommodate for the need for a controlled installation of the elements and for later stability purposes.

The length of the crossbeam 1 is adjustable to accommodate for variations in cable length and cable tension. The length of the crossbeam 1 is also adjustable to accommodate for variations in the distance between the anchors 5 at the end of each feeding tower 2. Alternatively may the length of the crossbeam 1 be fixed and the attachment of the feeding towers 2 to the crossbeam 1, variable. The main issue is the adjustment of the distance between the feeding towers at the location of the crossbeam 1. Adjustment of this distance is required as an additional measure to adjust the wire tension. The adjustment of the distance between the towers 2 at the location of the crossbeam 1 also enables adjustment of the distance between the pulleys 7 on each feeding trolley, and thus the distance D between the upper and lower wire of the wire loop.

The length of the crossbeam 1 is adjusted using an electric linear actuator 12 to avoid using hydraulics. Hydraulics may however be used if required. Suitable sensors monitor the compressive force on the crossbeam 1 and the distance between the towers.

FIG. 1 shows the wire loop and the trolleys 2 in an upper position when the cut commences.

A method of installation of the cutting system includes installing the feeding towers 2, installing the wire on the feeding trollies 8, install the crossbeam 1 and the sawing system is ready for cutting. The feeding trollies 8 are typically installed onto the feeding towers before installing the feeding towers onto the seabed.

The feeding towers 2 are typically installed on the seabed with suction anchors 5 allowing the anchors to be easily installed by pumping water out of the anchors or released by pumping water into the anchors. The anchors typically involve another anchoring system on a rocky seabed.

The transition between the crossbeam 1 and the feeding towers 2 allows a certain degree of twist or angular displacement to allow adjustment of the distance between the feeding towers. Alternatively may the components be slightly flexile to allow the adjustable length crossbeam 1 to alter the distance between the feeding towers 2. The transition at the lower end of the feeding towers at the seabed attachment portion may also be slightly flexible to allow the slight angular adjustment of the feeding towers by the variable length crossbeam 1.

The feeding towers may also be fastened with backstays to the seabed to prevent swaying in strong currents. This may require additional suction anchors.

Figure 2:
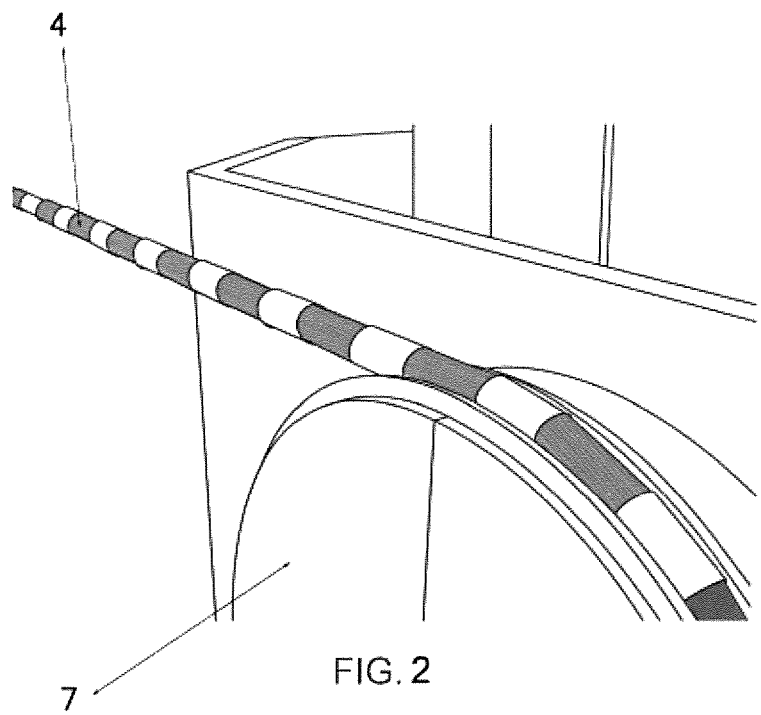
FIG. 2 shows a detail of a wheel or pulley and a sawing wire used in the system of the invention.

FIG. 2 shows a detail of a pulley or wheel 7 for driving the sawing wire 4. The wheel 7 is driven by an electric motor and the speed and torque is monitored and controlled. The wheel is somewhat inclined to rotate the sawing wire 7 around its own axis to distribute the wear and to reduce the risk of jamming of the sawing wire 4. The degree of inclination in relation to a plane defined by the wire loop, may be adjustable to adjust the rate of rotation of the wire around its own axis. The wire is a steel wire with rings and diamond inserts. The diameter of the sawing wire is typically between 50 and 85 mm. The wheel 7 is grooved to accommodate for the sawing wire and to facilitate the rotation of the wire along its own axis. The size of the groove is typically in the area of the diameter of the wire.

Figure 3:
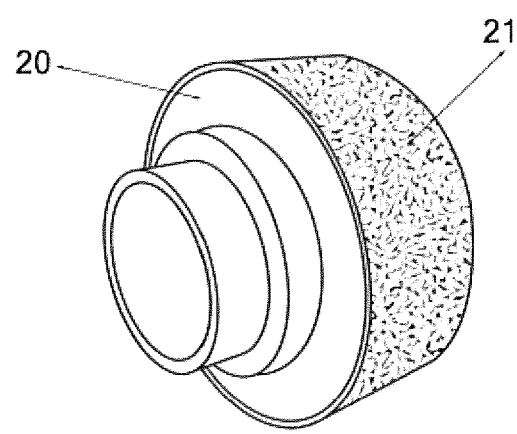
FIG. 3 shows a detail of a diamond insert ring that may be used on a sawing wire used in the system of the invention.

FIG. 3 is an example of a diamond insert ring 20 that may be attached to a wire. The ring 20 has an outer diameter of 58 mm, inner diameter of 26 mm and diamond inserts 21 are located on a portion that is 22 mm wide. The ring will typically fit on a 26 mm wire. The wire is a DADW diamond wire.

Figure 4:
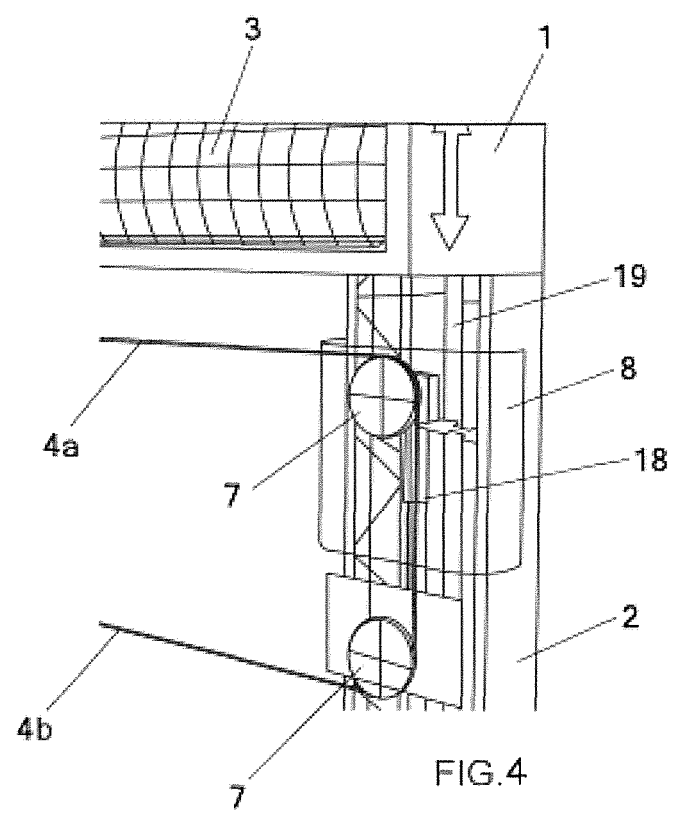
FIG. 4 is a perspective view of a detail of a feeding trolley, crossbeam, sawing wire and feeding tower used in the system of invention.

FIG. 4 is a detail of the feeding trolley 8, longitudinally displaceable on the feeding tower 2. The crossbeam 1 is longitudinally displaceable along the feeding tower 2, and includes inflatable, buoyant elements 3 for adjusting the buoyancy force and thus the erecting force on the structure. Actuators may be provided to enable displacement of the crossbeam 1 along the feeding tower 2. Alternatively may the displacement of the crossbeam be provided by lockable elements and adjustment of the buoyancy of the inflatable elements 3. The crossbeam 1 provides structural support. The two wheels 7 are supported in bearings in the feeding trolley 8 and the distance between the two wheels is adjustable by an electric tension control actuator. The electric tension control actuator provides full dynamic control of the tension by distance adjustment of the wheels 7. A cable carrier 19 carries the cables inside the feeding tower 2. The feeding trollies thereby include a wheel motor, an actuator for longitudinal displacement of the feeding trolley 8, an actuator for adjusting the distance between the wheels 7, and an actuator controlling the wheel inclination. The force on the wheels 7 is also controlled to monitor wire tension. The components on each feeding tower are the same for improved redundancy and control The angle of the wire 4b where it leaves the wheels is also monitored by either monitoring the direction of the force on the lower wheel 7 or by monitoring the angle of the wire directly, for instance with optical or mechanical systems. The angle of the wire provides useful information as the angle may indicate problems with displaced cargo etc.

Sensors monitor the wheel speed, and slippage is deduced from difference in wheel speed of the various wheels 7. The angle of the upper wire 4a is not similarly important to monitor. The motor drives the upper wheel and the lower wheel is only a guide and tensioning wheel that also is used to monitor slippage.

At least one of the feeding trollies 8 include a wire cutter for emergency cutting of the wire. Emergency cutting is typically performed if cargo fall onto the wire and the load on the structure exceeds certain limits. Emergency cutting may also be performed if the cutting wire get stuck to enable the feeding trollies 8 to be returned to their initial position, to install a new wire and to resume cutting.

The system may sense problems based on the parameters read from the sensors that include wire tension and angle to quickly adjust wire tension or cut the wire to prevent overloading and damaging the system. The system parameters may also be adjusted to prevent premature wear or overload of the wire.

The wire may be driven continuously at either direction. Alternatively may the wire be driven both ways back and forth. Flexibility in the driving parameters may be necessary to accommodate for unpredictable situations typically due to moving cargo, falling structures, structures breaking apart etc.

FIG. 5 corresponds to FIG. 1, but the two feeding trollies 8 are located at a difference distance from the top of the feeding towers 2. This is to provide a skew cutting line and to show that the feeding trollies may be operated independently. The feeding trollies may be run up or down along the feeding towers 2 along guide rails or tubes and wires can be used to pull the feeding trollies up or down. Actuators for moving the feeding trollies may also be located in or on the feeding towers 2.

FIG. 5 shows the ship 6 to be cut. The two feeding trolleys 8 are each shown with two wheels or pulleys 7 for the wire loop with an upper wire portion 4a and a lower wire portion 4b. A distance is formed between the upper wire portion 4a and the lower wire portion 4b. The two feeding trolleys 8 run along the two feeding towers 2. The two feeding towers 2 are secured to the seabed with two suction anchors 5. The crossbeam 1 includes buoyant elements 3 for keeping the feeding towers 2 in an upright position. An actuator assembly 12 in relation to the crossbeam 1 adjusts the distance between the two feeding towers 2 by adjusting the crossbeam length or by adjusting the location of the attachment of the crossbeam 1 on the two feeding towers 2. The actuator assembly 12 includes provisions for sensing the distance between the two feeding towers and for sensing the force imposed by the actuator on the two feeding towers.

A port and a starboard actuator 13 controls the position of the crossbeam 1 along the length of the two feeding towers 2 independently. FIG. 5 schematically also indicates a motor 14 for driving the wheels 7, thus providing wire drive, and a wire tension control actuator 15, controlling the distance between the wheels on each feeding trolley, a guide wheel speed sensor 16, a feeding trolley absolute position sensor 17, a guide wheel force vector sensor 19 and a wire cutter 19. All the systems will typically include these components including the actuator assembly 12, even is the components only are shown in connection with the port side of FIG. 5.

FIG. 6 corresponds to FIGS. 1 and 5, but the feeding trollies 8 are moved to a location at the lower part of the feeding towers just before the cut is finished. The crossbeam 1 is in a lower position that the position of the crossbar 1 of FIG. 5.

FIGS. 7-14 are schematic representations of a wire saw at different modes of operation and at different cutting scenarios. The figures also indicate the different parameters that are monitored and controlled. All the FIGS. 7-14 show two feeding towers 2, two feeding trollies 8, four wheels 7, an object to be cut (in the following just object) and a loop of sawing wire 4.

The loop of sawing wire 4 includes the upper wire portion 4a and the lower wire portion 4b. An electric motor is located in each trolley for driving at least one of the pulleys at each trolley 8. The crossbeam and seabed are omitted for clarity.

FIG. 7 shows a situation with only one wire 4b within the object. The feeding trolleys 8 are fed at the same rate along the two feeding towers 2 and the motor torque, the wire tension, the wire speed, the forces on the lower wheels 7 are monitored. The forces on the lower wheels 7 are monitored in both an X direction and a Y direction perpendicular to the X direction. A resultant magnitude and direction of the force are deduced from these parameters. A normal operating area is indicated as dashed lines between an upper and lower limit.

FIG. 8 shows a normal situation where the sawing wire cuts into a piece of cargo 10 or structure extending over a large portion of the object. The wire cutting power, the wire tension and the angle of attack (the angle of the wire) are monitored. Wire speed, direction, angle of attack, tension and wheel slip are controlled.

FIG. 9 shows a situation where the sawing wire cuts into a hard object 11 and the load on the wire is concentrated on this. The wire cutting power, the wire tension and the angle of attack (the angle of the wire) are monitored. The hard object 11 is recognized by wire angle and wheel force direction.

Wire speed and direction is controlled and wire feed and angle of attack are controlled to avoid overload. Tension and wheel slip are controlled and the feeding trollies are moved individually while constantly monitoring the load.

FIG. 10 shows a situation where the sawing wire snaps (undergoes a sudden reduction of wire tension) without breaking. In this situation a rapid wire tension decrease is detected. To prevent overloading the system and to ensure full control and predictable parameters are the tension control actuators locked in position, the feeding trolley feeding is topped, the wire speed is stopped or decreased, wire tension is slowly increased and wire speed and feeding is resumed. (Number 1 indicates the wire under tension and number 2 indicates the slack wire)

FIG. 11 shows a situation where the sawing system compensate for moving cargo.

Rapid wire tension increase is sensed. The wire tension control actuator is released, the feeding trolleys are allowed to move freely, and if tension continues to increase outside available compensation area, the wire cutter or cutters are initiated and the wire is cut.

FIG. 12 shows a situation where the sawing system releases jammed wire. The motor torque, wire angle, wheel force direction, and wire wheel slip is sensed. Both wire drive motors are driven in alternating direction and if the wire not can be released, then the wire with is cut the wire cutters.

FIG. 13 shows a situation where the sawing system releases jammed and cut off wire after installation of new wire. In this situation is the feeding speed sensed. When the material removal rate is back to normal, the old wire is out of the cutting line. The motors are driven in alternating directions to remove the old wire from the cutting line. The old wire will be cut and/or disposed into a void.

FIG. 14 shows a situation where the sawing system finishes the cut. In this situation the feeding speed, the motor torque and the wire tension is sensed. The wire operating area is optimized (increased) typically by increasing tension, the feeding trolleys are aligned on both the feeding towers to the same vertical position, the feeding trollies are fed slowly until the motor torque and wire tension decreases rapidly (i.e. wire is through). The wire is also tensioned and at minimum length to reduce snapping deflection of wire. A rapid change of torque on the motors and tension in the wire identifies that the cut is finalized.

FIG. 15 shows the various functions and components of the system. Each parameter that is sensed and monitored is received from a corresponding sensor or probe. The data from the sensors, the drive currents, etc. is fed to the control unit that includes a computer with a computer program and a computer screen. The computer can control the operation automatically. Alternatively may an operator manually override the program controlling the sawing system. The control of the system may take place at a remote location, and an operator may monitor and operate several sawing systems simultaneously independent on location. All parameters that are vital to ensure ideal cutting parameters and to prevent overloading the system and failure of components are monitored to prevent overheating of motors, slipping sawing wire cutting into the drive pulleys, overloading mechanical components, jamming of the sawing wire etc.

The crossbeam includes the crossbeam actuator assembly 12, further including sensors indicating position, crossbeam force in a longitudinal direction, feeding tower alignment offset and crossbeam actuator motor drive status.

The port feeding trolley 8P corresponds to the starboard feeding trolley 8S, and they include sensors indicating absolute position (fixed reference), feeding speed, feeding force, motor temperature (alarm) and insulation resistance (L1, L2, L3).

The port wire drive wheel motor 14P corresponds to the starboard wire drive wheel motor 14S, and they include sensors indicating speed, current, torque (from current), insulation resistance (L1, L2, L3), motor temperature (alarm) drive wheel slip (calculated) and calculated wire speed.

The port tension control actuator 15P corresponds to the starboard port tension control actuator 15S, and they include sensors indicating displacement, tension force, motor temperature alarm, insulation resistance (L1, L2, L3) and tension release on/off.

The port guide wheel 16P corresponds to the starboard guide wheel 16S, and they include sensors indicating speed, force and force vector (direction and magnitude of the force on the wheel from the wire).

Reference 22 indicates the continuous wire geometry calculation and material removal rate.

A crane can be connected to the object via a lifting arrangement to secure the cut, and the crane can lift the section directly after the cut is finished.

The operation of the cutting process can be done from a nearby ship through an umbilical, and the monitoring and control can be done at any location real-time through a communication system. The cutting process is performed with continuous cutting geometry calculation including, monitoring all control parameters and measurements including material removal rate.

A man machine interface (computer/control system and computer screen) gives an operator full control over the sawing process, and all sensors and control signals are simple and logically displayed on the operator screen. The operator screen displays all trends, measurements and control signals that are logged and that can be viewed real time.

It should be noted that the terms "above", "below", "under", "over" etc. refers to directions or locations in relation to the way the system of the invention is used in normal operation and as shown on the drawings to ease the understanding of the invention and to facilitate the description of the relative location of the various components. It should however be noted that such references not are intended to limit the invention.

The invention claimed is:

1. A seabed attachable subsea wire sawing system comprising:
   a first feeding tower with a first feeding tower first end with a seabed attachment portion for attachment to a seabed floor;
   a second feeding tower with a second feeding tower first end with a seabed attachment portion for attachment to the seabed floor;
   a first wire feeding trolley connected to and linearly displaceable a cutting distance along the first feeding tower;
   a second wire feeding trolley connected to and linearly displaceable a cutting distance along the second feeding tower;
   at least two cutting wire pulleys on each wire feeding trolley whereof at least one cutting wire pulley on each wire feeding trolley is motorized;
   wherein the cutting wire forms a loop and traverses between the two cutting wire pulleys on each first wire feeding trolley;
   an adjustable crossbeam located between the first feeding tower and the second feeding tower above the first wire feeding trolley, the second wire feeding trolley;
   at least one crossbeam actuator assembly in connection with the adjustable crossbeam enabling adjustment of a distance between the first feeding tower and the second feeding tower at the location of the crossbeam.

2. The system of claim 1, wherein the crossbeam is an adjustable length crossbeam and the at least one crossbeam actuator assembly is provided to adjust the length of the crossbeam.

3. The system of claim 1, wherein the first feeding tower and the second feeding tower are substantially parallel.

4. The system of claim 1, further comprising at least one buoyancy device within the crossbeam.

5. The system of claim 1, further comprising a suction anchor connected to the seabed attachment portion of each feeding tower.

6. The system of claim 1, wherein the crossbeam is linearly displaceable along the first feeding tower and the second feeding tower in a direction substantially parallel to said feeding towers.

7. The system of claim 6, further including a crossbeam height actuator at each side of the crossbeam provided to enable independent displacement of the crossbeam along the first feeding tower and the second feeding tower.

8. The system of claim 1, wherein the cutting wire loop extending between the first wire feeding trolley and the second wire feeding trolley, forms a distance D between an upper wire and a lower wire, and wherein the cutting distance is greater than the distance D between the upper wire and the lower wire, whereby both the upper wire and the lower wire are allowed to extend through an object to be cut.

9. The system of claim 1, further including a wire tension control actuator arranged to adjust a distance between the at least two cutting wire pulleys or guide wheels of each wire feeding trolley for adjusting at least one of cutting wire tension, cutting wire angle, cutting wire pulley or guide wheel contact angle.

10. The system of claim 1, wherein a distance between the first feeding tower and the second feeding tower is at least 50 m.

11. The system of claim 10 wherein the length of the cutting wire is at least 110 m.

12. The system of claim 1 further including at least one wire cutter located on each wire feeding trolley.

13. A method for performing a substantially vertical cut in a large subsea structure with an system according to claim 9, and wherein the cutting wire forms a cutting wire loop with an upper wire and a lower wire extending between the first wire feeding trolley and the second wire feeding trolley, comprising:
    installing the system onto a seabed over the large subsea structure to be cut from an installation vessel;
    lowering the first wire feeding trolley along the first feeding tower and the lowering the second wire feeding trolley along the second feeding tower until the lower cutting wire extending between the first feeding wire feeding trolley and the second wire feeding trolley reaches the large subsea structure to be cut;
    lowering the crossbeam to a location adjacent and above the wire feeding trolleys;
    driving the cutting wire loop between the first wire feeding trolley and the second wire feeding trolley;
    lowering the wire feeding trolley while cutting the large subsea structure;
    continue lowering the crossbeam to a location adjacent and above the large subsea structure that is cut;
    continue lowering the wire feeding trolleys while cutting the large subsea structure and while monitoring cutting wire tension, wire speed, motor current and torque, feeding trolley position, wire direction, wire slip, feeding and angle of attack.

14. The method of claim 13 further including feeding signals from the monitoring step to a control unit;
    and in the event of a signal indicating rapid cutting wire tension decrease, lock tension control actuators in position, stop the lowering of the wire feeding trolleys, reduce or stop wire speed, slowly increase wire tension and resume wire speed and feeding.

\* \* \* \* \*